(12) United States Patent
Rakoczy

(10) Patent No.: US 7,971,552 B1
(45) Date of Patent: Jul. 5, 2011

(54) FREE-STANDING, PORTABLE SUPPORT SYSTEM STAND FOR PROVIDING LIQUID AND FOOD FOR PETS/ANIMALS

(76) Inventor: Betsie Marshall Davis Brooks Rakoczy, St. Petersburg, FL (US)

( * ) Notice: Subject to any disclaimer, the term of this patent is extended or adjusted under 35 U.S.C. 154(b) by 236 days.

(21) Appl. No.: 12/291,314

(22) Filed: Nov. 7, 2008

Related U.S. Application Data (63) Continuation-in-part of application No. 10/647,006, filed on Aug. 22, 2003, now abandoned, which is a continuation-in-part of application No. 10/146,977, filed on May 16, 2002, now Pat. No. 6,684,815.

(51) Int. Cl.
*A01K 7/00* (2006.01)
(52) U.S. Cl. ......................................... 119/72
(58) Field of Classification Search .................. 119/71, 119/72, 72.5, 61.5, 75, 475, 454; 211/74, 211/85.18; 248/102–106, 146, 149, 132, 248/176.1, 152; 215/395
See application file for complete search history.

(56) References Cited

U.S. PATENT DOCUMENTS

| | | | |
|---|---|---|---|
| 2,615,235 A | 10/1952 | Highwood | |
| 4,326,648 A * | 4/1982 | Kieber | 222/162 |
| 4,463,859 A * | 8/1984 | Greene | 215/11.1 |
| 4,848,714 A | 7/1989 | Ziaylek | |
| 5,040,756 A * | 8/1991 | Via Cava | 248/103 |
| 5,301,634 A * | 4/1994 | Ho | 119/477 |
| 5,681,019 A * | 10/1997 | Boyce | 248/229.11 |
| 6,863,198 B1 * | 3/2005 | Darby | 224/403 |
| 6,926,243 B1 * | 8/2005 | Ziaylek et al. | 248/307 |
| 7,337,746 B2 * | 3/2008 | Clark et al. | 119/71 |

* cited by examiner

Primary Examiner — Kimberly S Smith (57) ABSTRACT

A water bottle has a main body section and a dispensing mechanism. A tapering section is between the main body section and the water dispensing mechanism. A support base includes a horizontal lower plate and a vertical upper plate, a pair of laterally spaced top holes and at least one pair of vertically aligned, laterally spaced additional holes. A bottle retainer has a vertical component. The vertical component has a pair of bolts. The bolts extend rearwardly from the vertical component. The bolts are spaced the same distance between the holes. A pair of horizontal components extend forwardly from the vertical component. Each of the horizontal components have an opening to receive the main body portion of the bottle. A rotation abater is secured to the bottle retainer with an angled face to contact the water bottle there adjacent.

1 Claim, 7 Drawing Sheets

FREE-STANDING, PORTABLE SUPPORT SYSTEM STAND FOR PROVIDING LIQUID AND FOOD FOR PETS/ANIMALS

RELATED APPLICATION

The present application is a continuation-in-part of U.S. patent application Ser. No. 10/647,006 filed Aug. 22, 2003 now abandoned which is a continuation-in-part of U.S. patent application Ser. No. 10/146,977 filed May 16, 2002 now U.S. Pat. No. 6,684,815, the subject matter of which applications is incorporated herein by reference.

BACKGROUND OF THE INVENTION

1. Field of the Invention

The present invention relates to a free-standing, portable support system stand for providing liquid and food for pets/animals and more particularly pertains to providing pets of varying numbers and sizes with drinking water by reconfiguring components of the system at the discretion of the user, the reconfiguring being done in a safe, convenient and economical manner.

2. Description of the Prior Art

The use of water systems of known designs and configurations is known in the prior art. More specifically, water systems of known designs and configurations previously devised and utilized for the purpose of providing drinking water to pets through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,848,714 issued Jul. 18, 1989 to Ziaylek relates to a Mounting Plate with Rollers and U.S. Pat. No. 2,615,238 issued Oct. 28, 1952 to Highwood relates to Tank Clamp Support Holder.

While these devices fulfill their respective, particular objectives and requirements, the aforementioned patents do not describe a free-standing, portable support system stand for providing liquid and food for pets/animals that allows for providing pets of varying numbers and sizes with drinking water by reconfiguring components of the system at the discretion of the user, the reconfiguring being done in a safe, convenient and economical manner.

In this respect, the free-standing, portable support system stand for providing liquid and food for pets/animals according to the present invention substantially departs from the conventional concepts and designs of the prior art, and in doing so provides an apparatus primarily developed for the purpose of providing pets of varying numbers and sizes with drinking water by reconfiguring components of the system at the discretion of the user, the reconfiguring being done in a safe, convenient and economical manner.

Therefore, it can be appreciated that there exists a continuing need for a new and improved free-standing, portable support system stand for providing liquid and food for pets/animals which can be used for providing pets of varying numbers and sizes with drinking water by reconfiguring components of the system at the discretion of the user, the reconfiguring being done in a safe, convenient and economical manner. In this regard, the present invention substantially fulfills this need.

SUMMARY OF THE INVENTION

In view of the foregoing disadvantages inherent in the known types of water systems of known designs and configurations now present in the prior art, the present invention provides an improved free-standing, portable support system stand for providing liquid and food for pets/animals. As such, the general purpose of the present invention, which will be described subsequently in greater detail, is to provide a new and improved free-standing, portable support system stand for providing liquid and food for pets/animals and method which has all the advantages of the prior art and none of the disadvantages.

To attain this, the present invention essentially comprises a free-standing, portable support system stand for providing liquid and food for pets/animals. First provided is a plurality of water dispensing bottles. The bottles include a small 32 ounce bottle. The small bottle has a main body section. The main body section has a circular cross sectional configuration. The plurality of water dispensing bottles also includes a large 64 ounce bottle. The large bottle has a main body section. The main body section has a square cross sectional configuration. Each bottle has a water dispensing mechanism. The water dispensing mechanism extends downwardly and at an angle from its associated bottle. Each dispensing mechanism includes a rigid tube. The rigid tube terminates with a pet activated ball. Each bottle is formed to include a tapering section. The tapering section is provided between the main body section and the water dispensing mechanism.

A plurality of support bases is provided. The support bases include a short base. The short base is about 20 inches high. The short base is for use by short pets. The support bases include a tall base. The tall base is about 35 inches high. The tall base is for use by tall pets. The support bases include at least one base of an intermediate height. Each support base includes a horizontal lower plate. The lower plate is provided below. Each support base includes a vertical upper plate. The upper plate is provided above. The upper and lower plates are coupled in an L-shaped configuration. Each upper plate has an upper edge. The upper plate has a pair of laterally spaced top holes. The top holes are located about 5 inches below the upper edge. The upper plate has a pair of laterally spaced bottom holes. The bottom holes are located below the top holes. The upper plate has at least one pair of vertically aligned, laterally spaced intermediate holes. The upper plate has a front surface. The upper plate has a rear surface. The front surface faces the lower plate.

Further provided is a plurality of bottle retainers. The bottle retainers include a small retainer. In this manner a small bottle is received and retained. The bottle retainers include a large retainer. In this manner a large bottle is received and retained. Each bottle retainer has a vertical component. The vertical component is about 6 inches high. Each vertical component has a front face. Each vertical component has a rear face. A pair of laterally spaced bolts are provided. The bolts extend rearwardly from the rear face of the vertical component. The laterally spaced bolts of each vertical plate are spaced a common distance which is the same as the common distance between all of the laterally spaced holes of each of the vertical plates of the support bases. A wing nut is operatively coupled to each bolt. In this manner interchangeability is facilitated. Each of the vertical components of the bottle retainers have a pair of horizontal components. The horizontal components are secured to the front face of the vertical component. The horizontal components include a lower horizontal component. The lower horizontal component is provided at a central extent of the vertical component. The horizontal components include an upper horizontal component. The upper horizontal component is provided above the horizontal lower component. Each of the horizontal components have an opening. In this manner the main body portion of an associated bottle is received. Each opening has a slot. The slot provides for the passage of the water dispensing mechanism of the water bottle. Each vertical component has a horizontal floor component. The horizontal floor component is provided below the horizontal lower components. In this manner a lower extent of the water bottle is contacted there above. Further in this manner the water bottle is held in position for use.

Provided last is a plurality of angled rotation abaters. The plurality of angled rotation abaters include a small bottle abater. The small bottle abater is formed as a block. The block is secured to the front face of the vertical component of the bottle retainer between the horizontal lower component and the floor component. The block has an angled face. In this manner the block contacts the main body portion of the water bottle there adjacent. The plurality of angled rotation abaters includes a large bottle abater. The large bottle abater is formed as an angled surface of the floor component. In this manner the intermediate section of the water bottle there adjacent is contacted.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved free-standing, portable support system stand for providing liquid and food for pets/animals which has all of the advantages of the prior art water systems of known designs and configurations and none of the disadvantages.

It is another object of the present invention to provide a new and improved free-standing, portable support system stand for providing liquid and food for pets/animals which may be easily and efficiently manufactured and marketed.

It is further object of the present invention to provide a new and improved free-standing, portable support system stand for providing liquid and food for pets/animals which is of durable and reliable constructions.

An even further object of the present invention is to provide a new and improved free-standing, portable support system stand for providing liquid and food for pets/animals which is susceptible of a low cost of manufacture with regard to both materials and labor, and which accordingly is then susceptible of low prices of sale to the consuming public, thereby making such free-standing, portable support system stand for providing liquid and food for pets/animals economically available to the buying public.

Even still another object of the present invention is to provide a free-standing, portable support system stand for providing liquid and food for pets/animals for providing pets of varying numbers and sizes with drinking water by reconfiguring components of the system at the discretion of the user, the reconfiguring being done in a safe, convenient and economical manner.

Lastly, it is an object of the present invention to provide a new and improved free-standing, portable support system stand for providing liquid and food for pets/animals. A water bottle has a main body section and a dispensing mechanism. A tapering section is between the main body section and the water dispensing mechanism. A support base includes a horizontal lower plate and a vertical upper plate, a pair of laterally spaced top holes and at least one pair of vertically aligned, laterally spaced additional holes. A bottle retainer has a vertical component. The vertical component has a pair of bolts. The bolts extend rearwardly from the vertical component. The bolts are spaced the same distance between the holes. A pair of horizontal components extend forwardly from the vertical component. Each of the horizontal components have an opening to receive the main body portion of the bottle. A rotation abater is secured to the bottle retainer with an angled face to contact the water bottle there adjacent.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
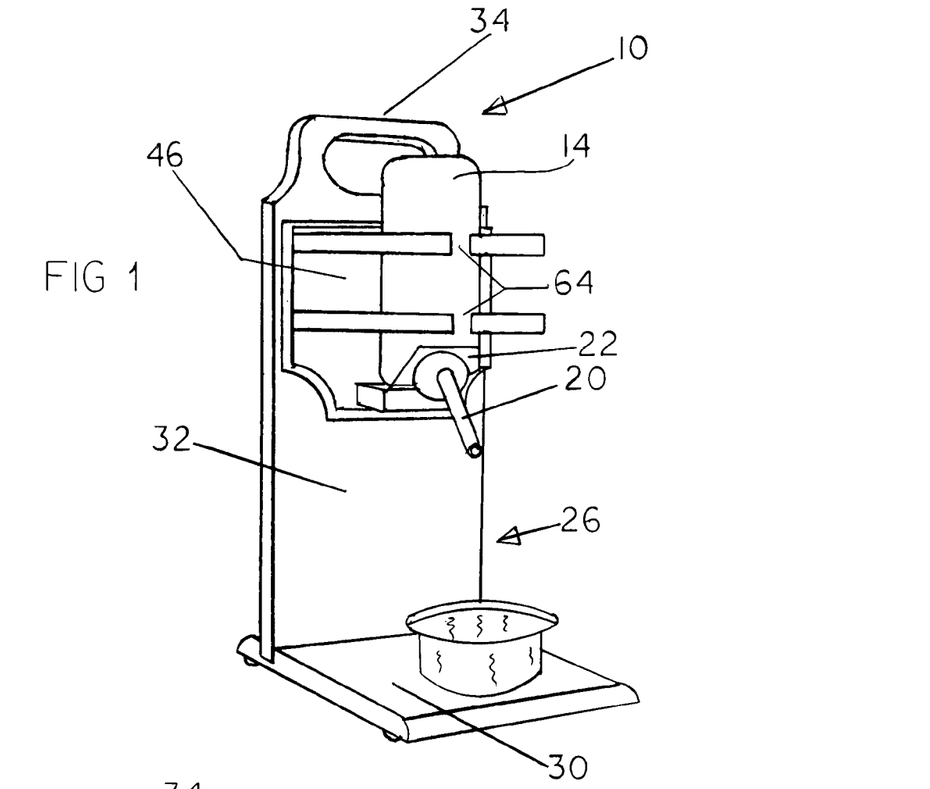
FIG. 1 is a perspective illustration of a free-standing, portable support system stand for providing liquid and food for pets/animals constructed in accordance with the principles of the present invention.
Figure 1A:
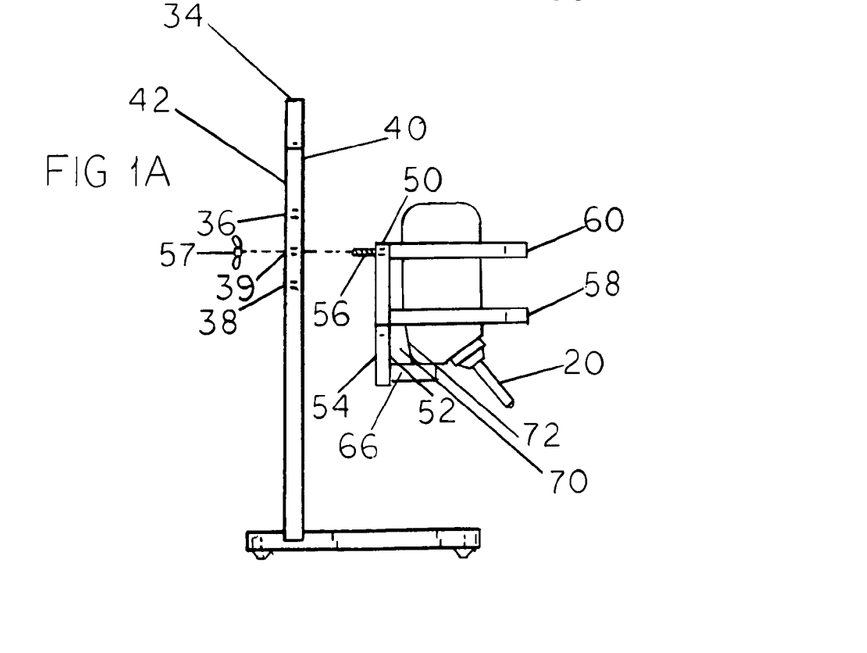
FIG. 1A is an exploded side elevational view of the system shown in FIG. 1.
Figure 1B:
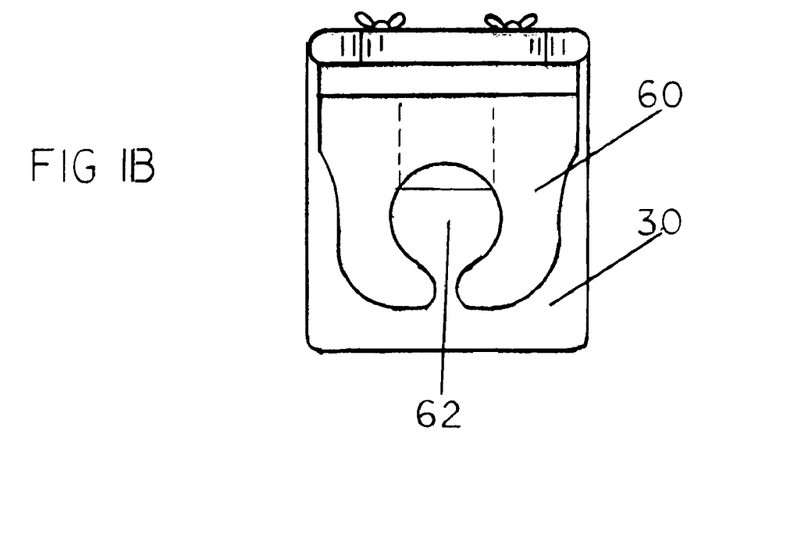
FIG. 1B is a top view of the system shown in FIG. 1.

With reference now to the drawings, and in particular to FIG. 1 thereof, the preferred embodiment of the new and improved free-standing, portable support system stand for providing liquid and food for pets/animals embodying the principles and concepts of the present invention and generally designated by the reference numeral 10 will be described.

The present invention, the free-standing, portable support system stand for providing liquid and food for pets/animals 10 is comprised of a plurality of components. Such components in their broadest context include a water bottle, a support base, a bottle retainer, and a rotation abater. Such components are individually configured and correlated with respect to each other so as to attain the desired objective.

First provided is a plurality of water dispensing bottles. The bottles include a small 32 ounce bottle 14. The small bottle has a main body section. The main body section has a circular cross sectional configuration. The plurality of water dispensing bottles also includes a large 64 ounce bottle 16. The large bottle has a main body section. The main body section has a square cross sectional configuration. Each bottle has a water dispensing mechanism 20. The water dispensing mechanism extends downwardly and at an angle from its associated bottle. Each dispensing mechanism includes a rigid tube. The rigid tube terminates with a pet activated ball. Each bottle is formed to include a tapering section 22. The tapering section is provided between the main body section and the water dispensing mechanism.

A plurality of support bases is provided. The support bases include a short base 26. The short base is about 20 inches high. The short base is for use by short pets. The support bases include a tall base 28. The tall base is about 35 inches high. The tall base is for use by tall pets. The support bases include at least one base of an intermediate height. Each support base includes a horizontal lower plate 30. The lower plate is provided below. Each support base includes a vertical upper plate 32. The upper plate is provided above. The upper and lower plates are coupled in an L-shaped configuration. Each upper plate has an upper edge 34. The upper plate has a pair of laterally spaced top holes 36. The top holes are located about 5 inches below the upper edge. The upper plate has a pair of laterally spaced bottom holes 38. The bottom holes are located below the top holes. The upper plate has at least one pair of vertically aligned, laterally spaced intermediate holes 39. The upper plate has a front surface 40. The upper plate has a rear surface 42. The front surface faces the lower plate.

Further provided is a plurality of bottle retainers. The bottle retainers include a small retainer 46. In this manner a small bottle is received and retained. The bottle retainers include a large retainer 48. In this manner a large bottle is received and retained. Each bottle retainer has a vertical component 50. The vertical component is about 6 inches high. Each vertical component has a front face 52. Each vertical component has a rear face 54. A pair of laterally spaced bolts 56 are provided. The bolts extend rearwardly from the rear face of the vertical component. The laterally spaced bolts of each vertical plate are spaced a common distance which is the same as the common distance between all of the laterally spaced holes of each of the vertical plates of the support bases. A wing nut 57 is provided for each of the bolts. In this manner interchangeability is facilitated. Each of the vertical components of the bottle retainers have a pair of horizontal components. The horizontal components are secured to the front face of the vertical component. The horizontal components include a lower horizontal component 58. The lower horizontal component is provided at a central extent of the vertical component. The horizontal components include an upper horizontal component 60. The upper horizontal component is provided above the horizontal lower component. Each of the horizontal components have an opening 62. In this manner the main body portion of an associated bottle is received. Each opening has a slot 64. The slot provides for the passage of the water dispensing mechanism of the water bottle. Each vertical component has a horizontal floor component 66. The horizontal floor component is provided below the horizontal lower components. In this manner a lower extent of the water bottle is contacted there above. Further in this manner the water bottle is held in position for use.

Provided last is a plurality of angled rotation abaters. The plurality of angled rotation abaters include a small bottle abater. The small bottle abater is formed as a block 70. The block is secured to the front face of the vertical component of the bottle retainer between the horizontal lower component and the floor component. The block has an angled face 72. In this manner the block contacts the main body portion of the water bottle there adjacent. The plurality of angled rotation abaters includes a large bottle abater. The large bottle abater is formed as an angled surface 74 of the floor component. In this manner the intermediate section of the water bottle there adjacent is contacted.

Figure 2:
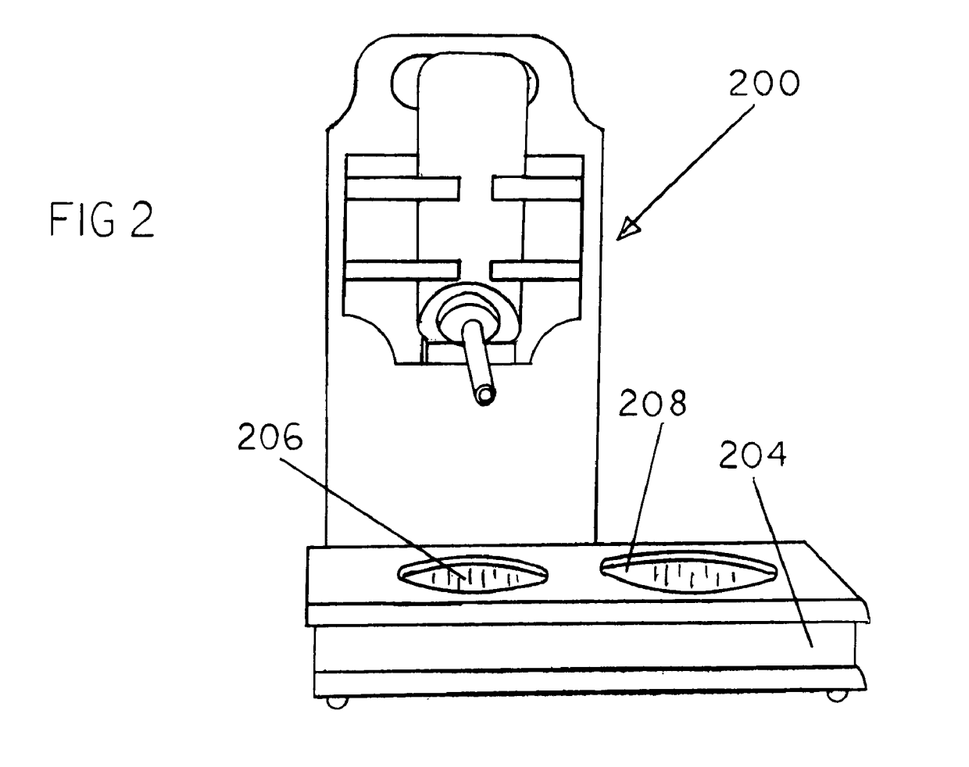
FIG. 2 is a perspective illustration of a system constructed in accordance with an alternate embodiment of the invention.

An alternate embodiment 200 of the present invention is illustrated in FIG. 2. A lower plate 204 is provided. The lower plate is laterally enlarged to one side. A drip pan 206 is provided. The drip pan is provided beneath the water dispensing mechanism. A laterally positioned food bowl 208 is provided.

Figure 3:
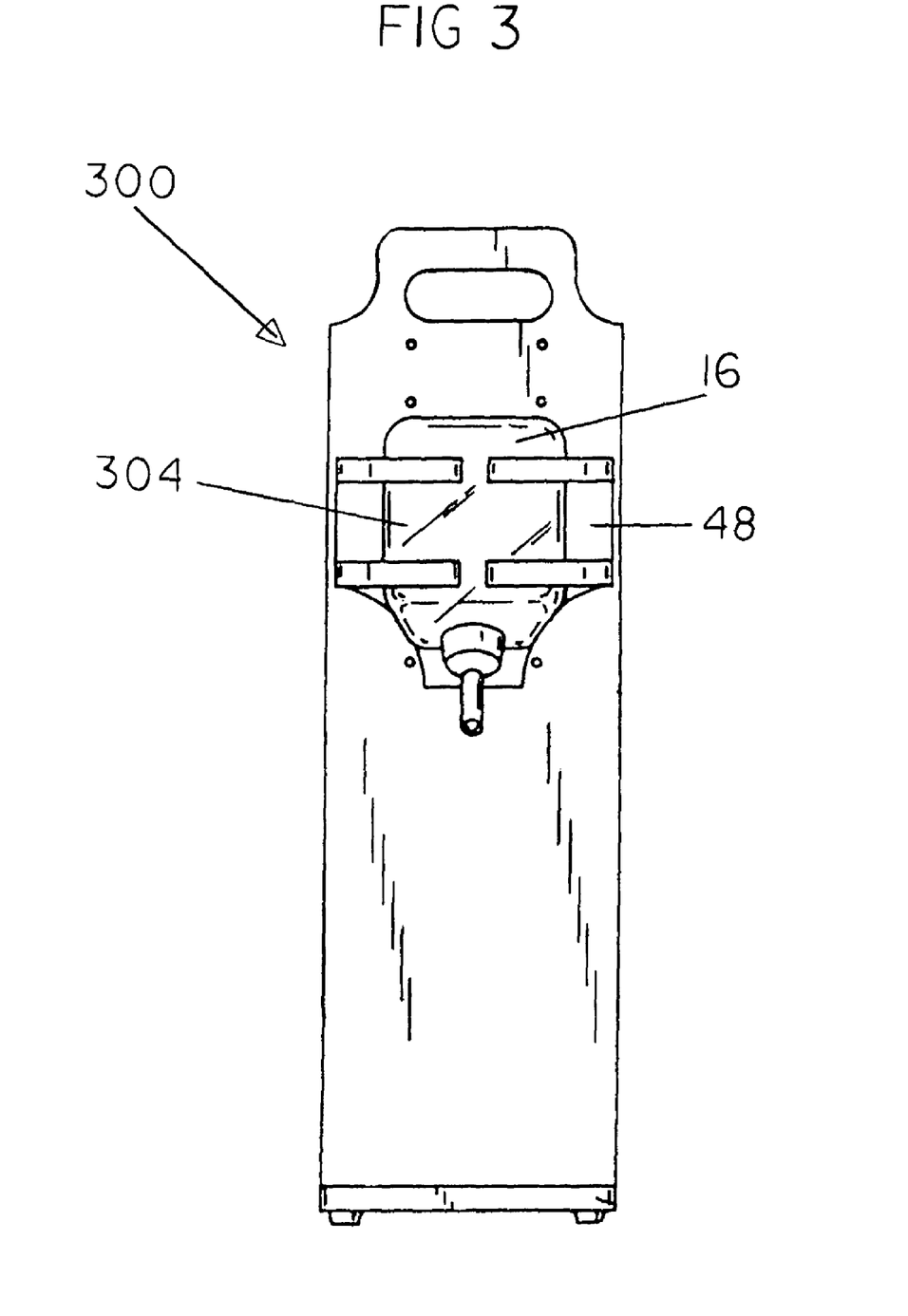
FIG. 3 is a perspective illustration of a system constructed in accordance with another alternate embodiment of the invention.
Figure 3A:
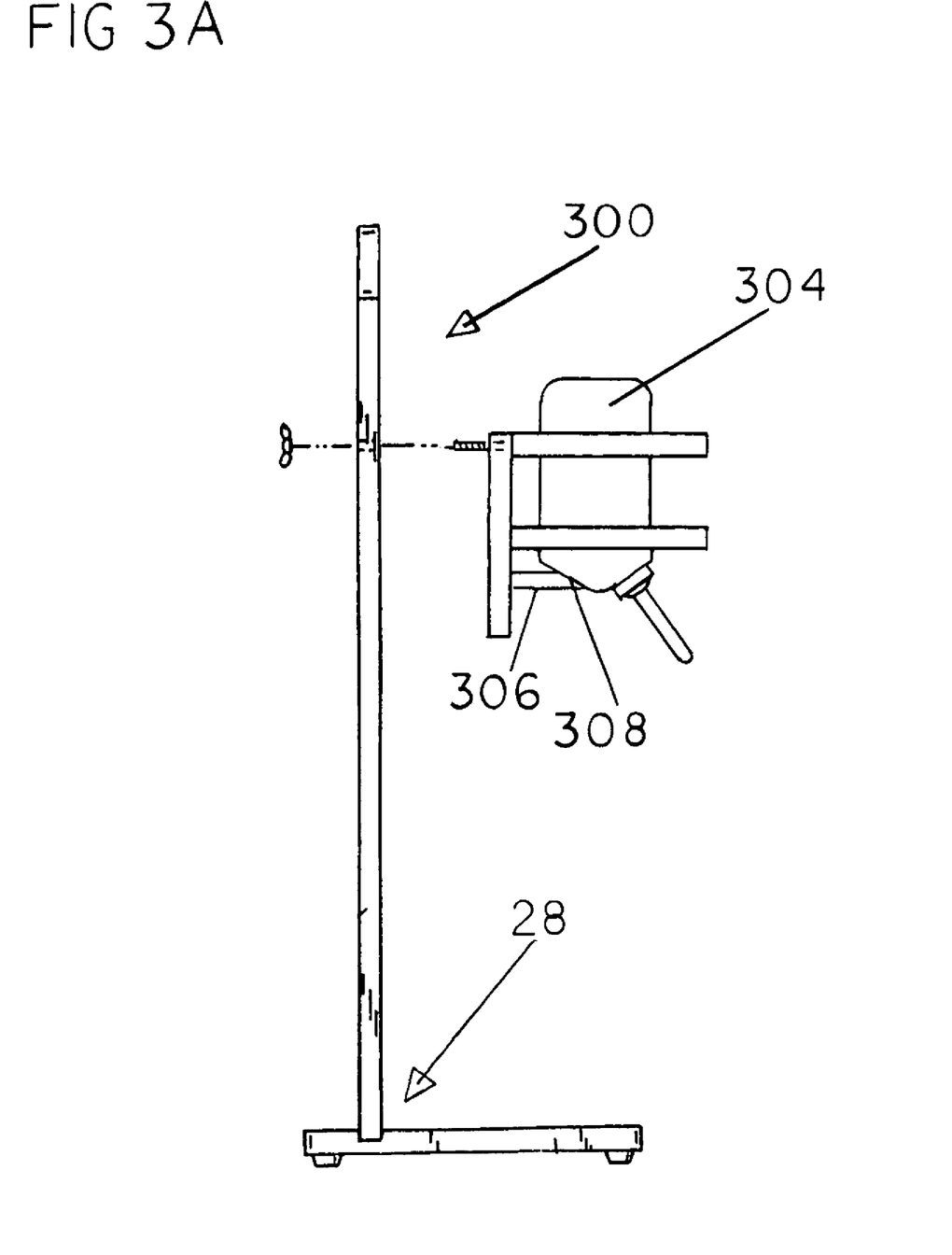
FIG. 3A is an exploded side elevational view of the system shown in FIG. 3.

A second alternate embodiment 300 of the present invention is illustrated in FIG. 3. A main body section 304 of the bottle is provided. The main body section has a square cross sectional configuration. The rotation abater is a floor 306. The floor is secured to the vertical component. The floor has an angled face 308. The angled face is provided in contact with the tapering section of the bottle.

Figure 4:
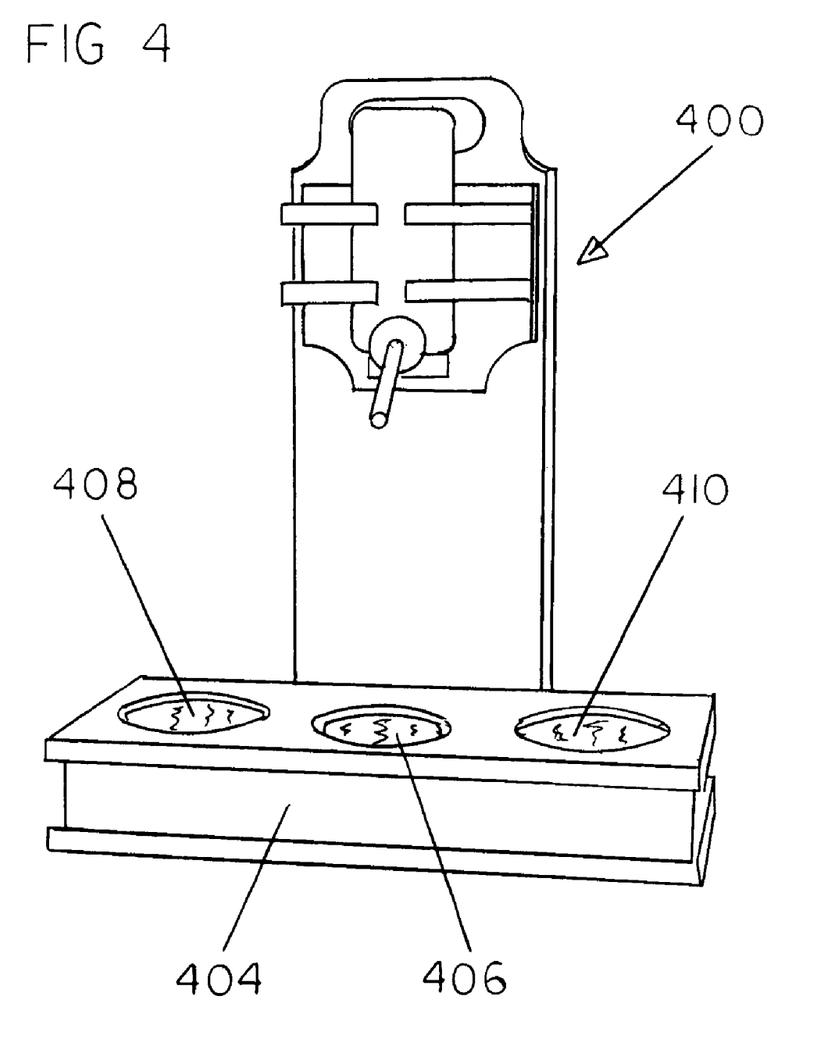
FIGS. 4 through 6 are perspective illustrations of systems constructed in accordance with additional alternate embodiments of the invention.

A third alternate embodiment 400 of the present invention is illustrated in FIG. 4. A lower plate 404 is provided. The lower plate is laterally enlarged to both sides. A drip pan 406 is provided. The drip pan is provided beneath the water dispensing mechanism. A laterally positioned food bowl 408, 410 is provide. The food bowl is provided on each side of the drip pan.

Figure 5:
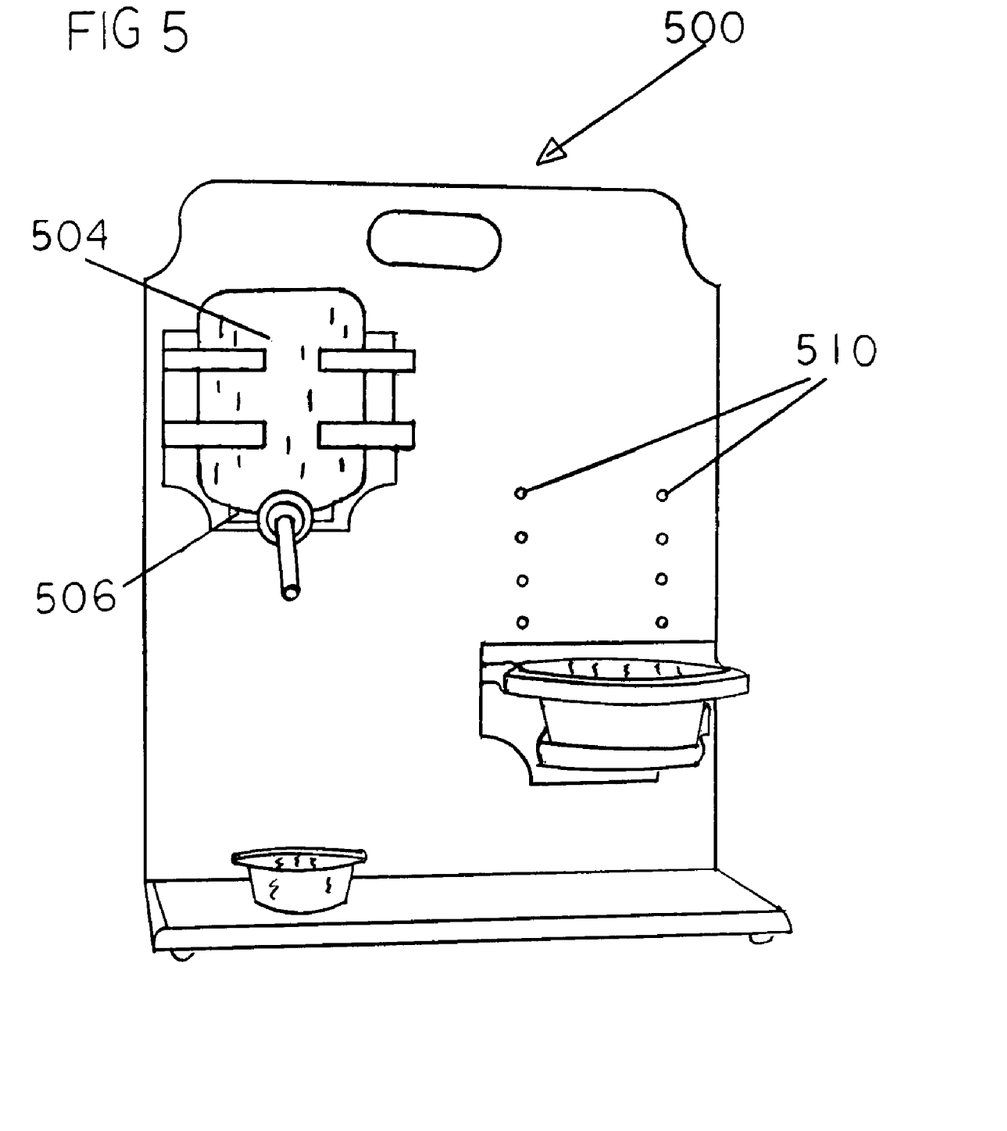

A fourth alternate embodiment 500 of the present invention is illustrated in FIG. 5. A main body section 504 of the bottle is provided. The main body has a square cross sectional configuration. The rotation abater is a floor 506. The floor is secured to the vertical component. The floor has an angled face 508. The angled face is provided in contact with the tapering section of the bottle. The support base is laterally enlarged. Additional pairs of holes 510 are provided. The holes are laterally spaced from the first recited pairs of holes. In this manner an additional retainer is received.

Figure 6:
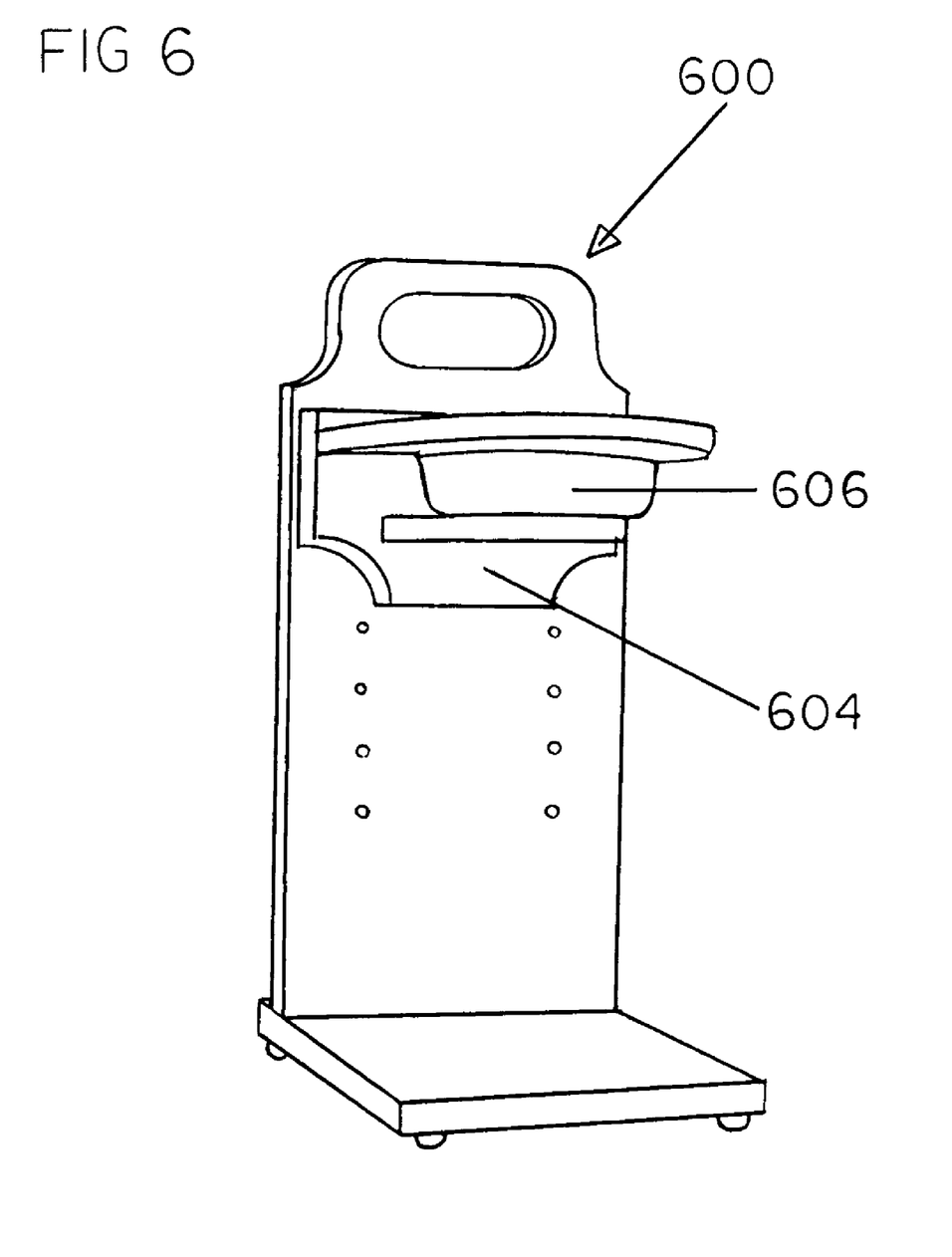

The last alternate embodiment 600 of the present invention is illustrated in FIG. 6. A bottle retainer 604 is provided. A food bowl 606 is provided. The bottle retainer is configured to receive and support the food bowl.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A free-standing, portable support system stand for providing liquid and food for pets/animals, the system consisting of:
    a water bottle having a main body section and a dispensing mechanism and a tapering section between the main body section and the dispensing mechanism, the main body section of the bottle section of the bottle having a round cross sectional configuration;
    a support base including a horizontal lower plate and a vertical upper plate, a pair of laterally spaced top holes and at least one pair of vertically aligned, laterally spaced additional holes, a hand aperture extending through the vertical upper plate above the top holes for lifting purposes;
    a bowl positioned on the horizontal lower plate beneath the dispensing mechanism of the water bottle adapted to collect unintended dripping;
    a bottle retainer having a vertical component with a pair of bolts extending rearwardly from the vertical component, the bolts being spaced the same distance between the holes, a pair of horizontal components extending forwardly from the vertical component, each of the horizontal components having a fixed opening to receive the main body portion of the bottle, the fixed openings being vertically aligned to facilitate passage of the dispensing mechanism during the movement of the water bottle to and from the bottle retainer, a horizontal floor component secured to the vertical component beneath the pair of horizontal components the vertical component and the horizontal components and the floor component being fabricated of a rigid, essentially inflexible material; and
    a rotation abater secured to the bottle retainer with an angled face to contact the water bottle there adjacent, the rotation abater being a block contacting the vertical component, the block having an angled face in contact with the main body section of the bottle, the block having a lower end contacting the horizontal floor component and the upper end above the horizontal floor component.

* * * * *